No. 610,375.  
C. E. ALVORD.  
SAGE BRUSH GRUBBER.  
(Application filed Nov. 16, 1893.)  
Patented Sept. 6, 1898.

(No Model.)

Witnesses:  
Herbert Bradley  
K. H. Fleming

Inventor.  
Clarence E. Alvord  
By Knight Bros  
Atty's.

UNITED STATES PATENT OFFICE.

CLARENCE E. ALVORD, OF CRESTED BUTTE, COLORADO, ASSIGNOR TO MARSHALL P. GETCHELL, OF GUNNISON, COLORADO.

SAGE-BRUSH GRUBBER.

SPECIFICATION forming part of Letters Patent No. 610,375, dated September 6, 1898.

Application filed November 16, 1893. Serial No. 491,148. (No model.)

*To all whom it may concern:*

Be it known that I, CLARENCE E. ALVORD, a citizen of the United States, and a resident of Crested Butte, in the county of Gunnison and State of Colorado, have invented certain new and useful Improvements in Sage-Brush Grubbers, of which the following is a specification.

This invention relates to an implement for uprooting sage-brush or other vegetable growth by an action similar to combing the ground. The implement comprises a suitable reversible beam from opposite sides of which project two similar sets of teeth, being trunnioned or otherwise made rotatable in a suitable frame by which the implement is controlled. The teeth are of two kinds — namely, short straight teeth and longer teeth straight for the greater part of their length but having slightly-upturned ends. I prefer to use about twice as many short teeth as long teeth, so that between each pair of long teeth there are two short teeth. The ends of the long teeth on the respective sides are turned or deflected in opposite directions, so that the direction of the deflection will always be upward when the teeth are presented in the direction in which the implement is drawn. Upon the trunnions of the beam are mounted rotatable draft-links to which the chains or equivalent drafting appliances are attached. The frame or mounting for the implement comprises a pair of runners or shoes which slide upon the ground to regulate the penetration of the teeth, and these runners afford bearings for the trunnion of the beam. Said runners are also preferably formed with integral trails or arms, in the rear ends of which is mounted a bar in convenient position for handling. I also prefer to form at least one of said arms with a bend or curve which provides a rear bearing and additional runner in rear of the runners in which the beam is trunnioned. One of the trunnions is formed with a ratchet, and one of the side bars carries a pawl which engages in said ratchet and prevents rotation of the beam except in a direction to reverse the teeth. This pawl also serves to turn the teeth down at such an angle when the frame is lifted that the teeth will be automatically reversed.

My invention consists in the above and other features of construction, which will be particularly pointed out in the claims and which will be more clearly understood from the drawings, in which—

Figure 1:
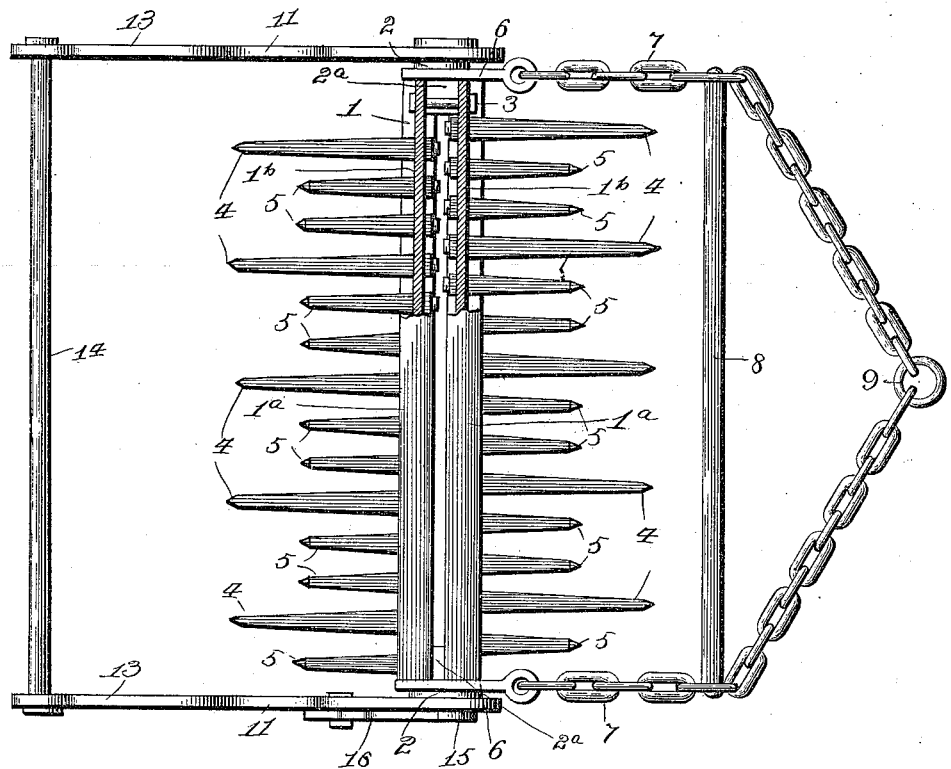
Figure 2:
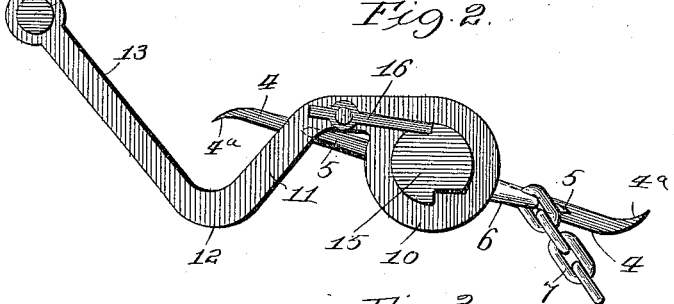
Figure 3:
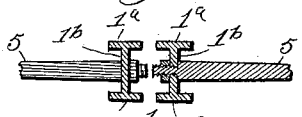

Figures 1 and 2 are respectively a plan and a side elevation of an implement constructed in accordance with my invention. Fig. 3 is a cross-section through the beam on the line $x\ x$, Fig. 1.

1 represents the beam, which is preferably constructed of two I-beams $1^a$, having trunnions 2, provided with rearwardly-extending space-blocks $2^a$, secured between their ends and clamped together by bolts 3, of which there may be any suitable number. The webs $1^b$ are prepared to receive the shanks of the long teeth 4 and short teeth 5, which project in opposite directions from the beam, said teeth being secured in any suitable manner on the inner sides of said webs. The short teeth 5 project about two-thirds the length of the long teeth 4, while the long teeth 4 are straight for the greater part of their length and have upturned ends $4^a$, as shown in Fig. 2.

6 represents links which are rotatably mounted upon the trunnions and to which are attached chains 7, which may be held out of interference with the teeth by an ordinary spread-bar 8 and joined together by a ring 9 or other suitable means where the draft-animals are to be attached.

10 represents shoes or runners perforated for the reception of the trunnions 2, and these shoes serve to regulate the penetration of the teeth into the ground. Extending rearwardly from the said shoes are the integral side bars 11, which are bent downwardly to form rear runners 12 and thence upwardly to form arms 13, in which is mounted the handle-bar 14. One of the trunnions carries a ratchet 15, while the side bar 11 has a pivoted pawl 16, which engages in said ratchet and prevents rotation in the wrong direction of the beam which carries the teeth. This pawl and ratchet also make such a connection between the frame or mounting and the beam that when the handle-bar 14 is lifted the angle of the teeth will be so increased as to cause the upturned ends of the long teeth to catch in the ground and reverse the beam, so as to present a clean set of teeth for operation.

The operation is as follows: The implement is drawn with the forwardly-presented teeth dipped a suitable angle to cause penetration in the ground a sufficient depth to uproot the sage-brush or other plant life which is to be eradicated. The upturned ends of the long teeth serve to regulate the depth of penetration, the bottom of the curved end acting in a measure as a runner and to loosen the ground for the combing effect between the teeth in rear of the ends of the short teeth. The machine is dragged in this way until the teeth get well filled with the uprooted plants, when the frame is lifted slightly to cause the curved teeth to catch, whereupon the gang-frame, composed of the beam and its teeth, will be reversed instantly and a clean set of teeth presented forward for continuation of the operation. At about the same time the material which is accumulated in the teeth which are now passed to the rear is stripped off or dropped as the implement proceeds.

Having thus described my invention, the following is what I claim as new therein and desire to secure by Letters Patent:

1. A grubbing and uprooting implement comprising two oppositely-projecting series or sets of teeth formed to cause penetration of the ground and fixed in a centrally-disposed beam, a drag-frame in which said beam is revolubly mounted near the ground so as to present the series of teeth lengthwise to the ground in approximately the plane of travel, whereby the roots are impaled and gathered upon the teeth up against the beam until the implement is reversed to clear the teeth, shoes or runners at the ends of the beam's axis to raise the beam slightly from the ground and cause the teeth to travel through the earth and additional rear runners for regulating, in connection with the shoes, the angle of the teeth and the degree of penetration and a pawl and notched head mounted respectively on the frame and the beam, substantially as explained.

2. In a grubbing or uprooting implement, the combination of a trunnioned beam, two similar series of straight parallel teeth lying approximately in the plane of travel and projecting from opposite sides of said beam, a suitable frame in which the beam is trunnioned, runners on which the implement travels located in the frame at the axes of the trunnions, and rear runners for fixing the angle at which the teeth are held and regulating their penetration substantially as set forth.

3. An implement for grubbing or uprooting, comprising a beam formed of two I-beams, trunnions secured between the ends of said I-beams, bolts for holding the I-beams together, teeth secured in the webs of the I-beams and projecting from opposite sides of the main beam, and a suitable frame in which the beam is mounted, substantially as herein explained.

4. In a machine of the character described, the combination with the beam provided with teeth, the shoe or runner perforated to form a bearing for trunnions on the ends of the beam, a rearwardly-extending arm deflected downward near its center to form a rear runner, said arm being integral with the first-named shoe or runner, the rear end of the arm forming a handle.

5. In a machine of the character described, the beam provided with teeth projecting from opposite sides, the side members comprising a bar bent downward near its center to form a runner, and provided with a depending enlarged end perforated, a pawl pivoted on said arm, a trunnion secured to the beam and adapted to work in the perforation, and cams integral with said trunnion adapted to be engaged by said pawl.

In testimony whereof I have signed this specification in the presence of two subscribing witnesses.

C. E. ALVORD.

Witnesses:
 D. C. WEST,
 J. W. LATHAM.